D. T. ABERCROMBIE.
DETACHABLE HANDLE FOR FRYING PANS AND OTHER CULINARY VESSELS.
APPLICATION FILED JUNE 17, 1908.
918,939.
Patented Apr. 20, 1909.
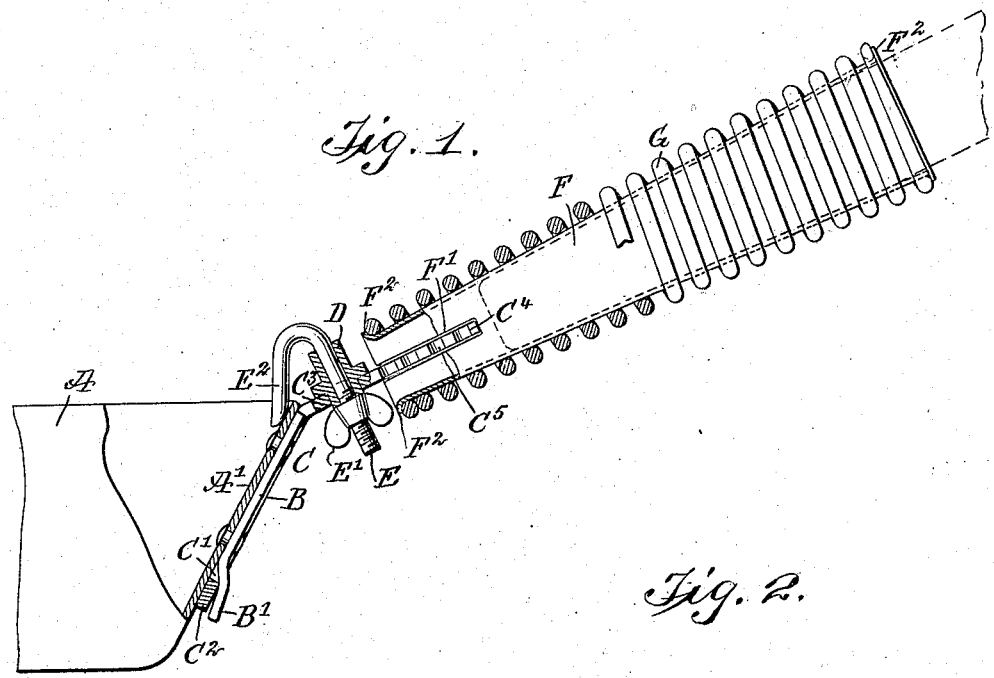
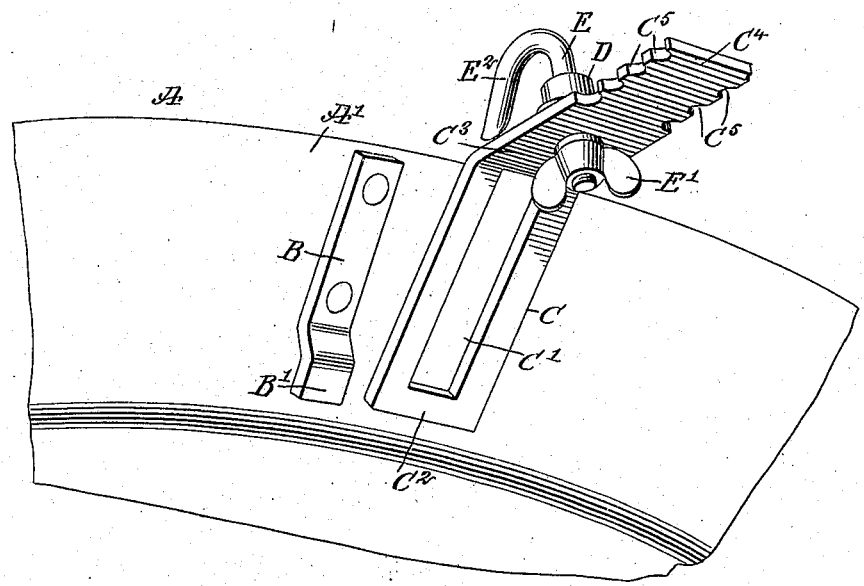
WITNESSES
INVENTOR
David T. Abercrombie
BY
ATTORNEYS

UNITED STATES PATENT OFFICE.

DAVID T. ABERCROMBIE, OF NEWARK, NEW JERSEY.

DETACHABLE HANDLE FOR FRYING-PANS AND OTHER CULINARY VESSELS.

No. 918,939.  Specification of Letters Patent.  Patented April 20, 1909.

Application filed June 17, 1908. Serial No. 438,953.

*To all whom it may concern:*

Be it known that I, DAVID T. ABERCROMBIE, a citizen of the United States, and a resident of Newark, in the county of Essex and State of New Jersey, have invented a new and Improved Detachable Handle for Frying-Pans and other Culinary Vessels, of which the following is a full, clear, and exact description.

The object of the invention is to provide a new and improved detachable handle for frying pans and other culinary vessels, arranged to permit of securely attaching the handle to the vessel when using the latter for its legitimate purposes, and to allow quick removal of the handle from the vessel for convenient shipping and storing purposes.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both views.

Figure 1 is a sectional side elevation of the improvement as applied to a frying pan; and Fig. 2 is a perspective view of the same, showing the handle detached.

The frying pan A is provided on the outer side of its rim with a fixed lug B for engagement by a plate C having an aperture C' into which fits the lug B, the end C² of the plate being adapted to pass under and hook onto the upturned lower end B' of the lug B. The plate C terminates at its upper end in an angular extension C³ provided with a bearing D in which is mounted to turn loosely a bolt E having its wing nut E' abutting against the under side of the extension C³. The upper end of the bolt E terminates in a return bend E² adapted to engage the inner side of the rim A' opposite the upper end of the lug B, as plainly indicated in Fig. 1.

The extension C³ is provided with a reduced end C⁴ having notches C⁵ extending into slot F' formed at the inner end of the tubular member F of the handle, and on which tubular member is coiled a wire G engaging with its convolutions the notches C⁵ in the reduced end C⁴ to attach the extension C³ and consequently the plate C firmly to the tubular member of the handle.

The ends of the tubular member F are formed into outwardly-extending flanges F², to engage the end convolutions of the wire G with a view to hold the wire against slipping off the tubular member F of the handle.

By the arrangement described, the several parts of the handle are united in a very simple manner, and on unscrewing the wing E' the bolt E can be given a quarter turn to disconnect the return bend E² from the rim A', and to allow disengaging the apertured plate C from the lug B, thus detaching the handle from the frying pan or a like culinary vessel. When it is desired to apply the handle, it is only necessary for the operator to hook the end C² onto the upturned end B' of the lug B, and to engage the aperture C' with the lug, and then the operator turns the bolt E, so as to bring the return bend E² in engagement with the inner side of the rim A', and then the operator screws up the wing nut E', to securely clamp the bolt in place on the rim A' of the frying pan or other culinary vessel.

By having the wire G coiled around the tubular member F of the handle, it is evident that the operator taking hold of the wire is protected against the heat imparted by the heated frying pan to the plate C and the member F, and, if desired, a stick may be passed into the outer open end of the tubular member F, to allow manipulating the pan by the use of the stick.

Having thus described my invention, I claim as new and desire to secure by Letters Patent:

1. In combination, a culinary vessel having a lug secured to the outer side of its rim and having an upturned end and a handle having an apertured plate for engagement with the said lug and its upturned end, a bearing on the said plate, and a clamping bolt held to turn in the said bearing and having a return bend for engagement with the inner side of the said rim opposite the said lug.

2. In combination with a frying pan or like culinary vessel having a lug secured to the outer side of the rim of the vessel and provided with an upturned end, of a handle having a tubular member, an apertured plate secured to the said handle member and adapted to fit onto the said lug and to hook onto the said upturned end, and a clamping bolt held to turn loosely on the said plate and having a return bend for engaging the inside of the said rim.

3. In combination with a frying pan or like culinary vessel having a lug secured to the outer side of the rim of the vessel and provided with an upturned end, of a handle having a tubular member, provided at its inner end with a slot, an apertured plate having an angular notched extension engaging the said slot, the said apertured plate fitting the said lug and hooking onto the upturned end thereof, a clamping bolt mounted to turn on the said plate and having a return bend for engagement with the inner side of the said rim, and a wire coiled around the said tubular handle member and engaging the notches of the said plate extension to fasten the same in place on the handle member.

4. A detachable handle for frying pans and like culinary vessels, comprising a plate having an integral notched extension and means for engagement with the rim of the culinary vessel, a tubular handle member having a slot at one end for engagement by the said plate extension, and a wire coiled around the said tubular handle member and having its convolutions engaging the notches of the said plate extension to hold the plate in position in the said tubular handle member.

5. A detachable handle for frying pans and like culinary vessels, comprising a plate having an integral notched extension and means for engagement with the rim of the culinary vessel, a tubular handle member having a slot at one end for engagement with the said plate extension, and a wire coiled around the said tubular handle member and having its convolutions engaging the notches of the said plate extension to hold the plate in position in the said tubular handle member, the ends of the latter being flanged outwardly to hold the wire against lengthwise movement on the tubular handle member.

In testimony whereof I have signed my name to this specification in the presence of two subscribing witnesses.

DAVID T. ABERCROMBIE.

Witnesses:
EVERARD B. MARSHALL,
F. W. HANAFORD.